Feb. 3, 1931.  F. W. SPERR, JR  1,791,086
PROCESS FOR DEHYDRATING GAS
Filed Oct. 11, 1926
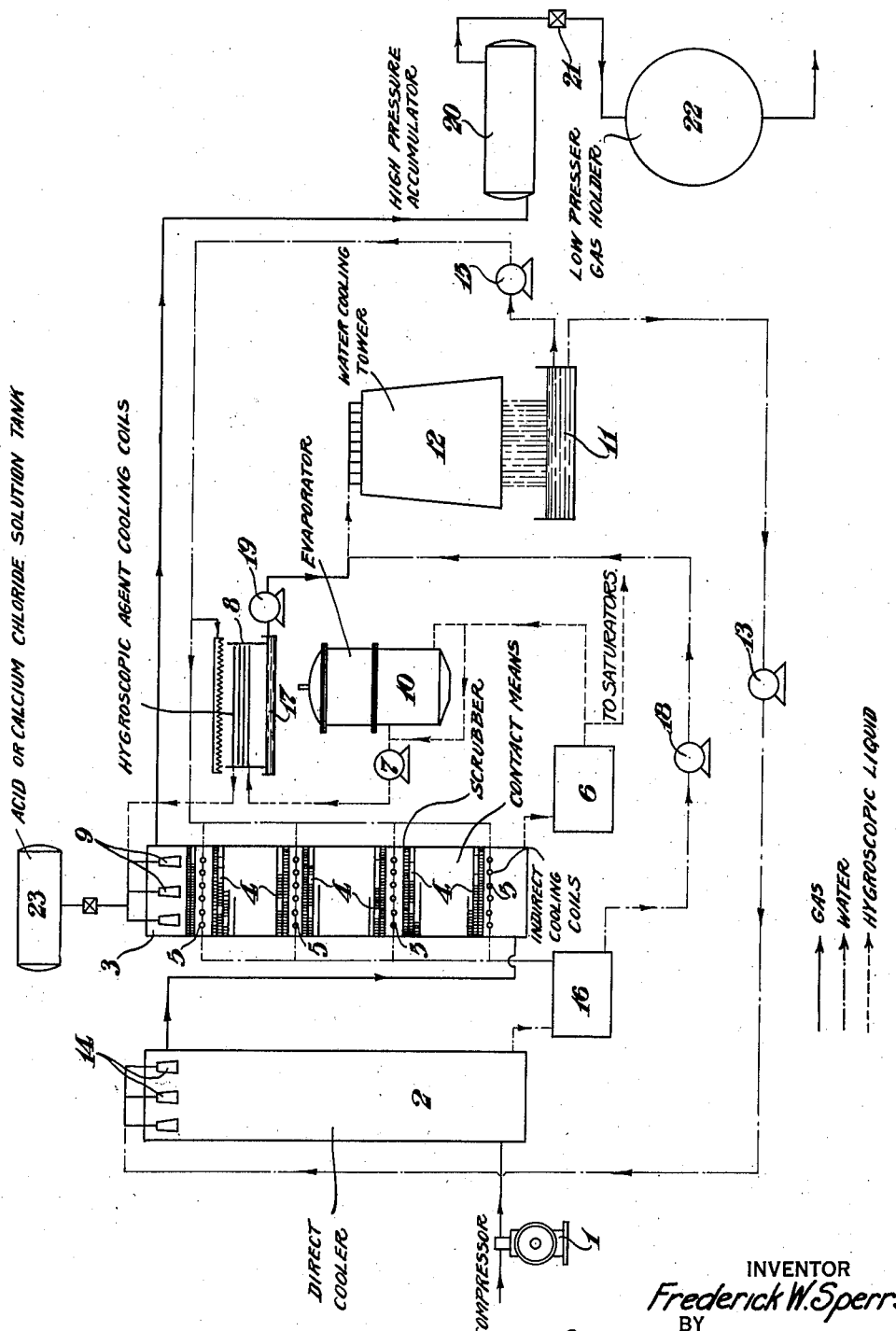
INVENTOR
*Frederick W. Sperr Jr.*
BY
*Jesse R. Langley*
ATTORNEY Patented Feb. 3, 1931

1,791,086

UNITED STATES PATENT OFFICE

FREDERICK W. SPERR, JR., OF PITTSBURGH, PENNSYLVANIA, ASSIGNOR TO THE KOPPERS COMPANY, A CORPORATION OF PENNSYLVANIA

PROCESS FOR DEHYDRATING GAS

Application filed October 11, 1926. Serial No. 140,749.

My invention relates to processes for dehydrating gas, such, for example, as fuel gases, coke oven gas, water gas and the like.

An object of my invention is to provide simple and efficient means for reducing the dew-point of gas.

A further object of my invention is to provide a process for dehydrating gas which avoids the necessity of employing refrigeration, either of the gas or of a hygroscopic agent employed to scrub the gas.

A further object of my invention is to provide a dehydrating process in which is secured economy in the use of a hygroscopic agent.

A further object of my invention is to provide against a rise in temperature of the gas due to the heat of dilution of the hygroscopic agent.

In accordance with my invention, I treat the gas under compression with a hygroscopic agent, preferably either a concentrated solution of calcium chloride, or sulphuric acid.

With respect to the use of the latter, a still further object of my invention is to avoid the dilution of the acid to such point that it could not be used to treat the gas for the recovery of ammonia and that it would be corrosive with respect to the usual iron and steel apparatus employed, and also to balance the amount required for dehydrating the gas with the amount necessary for recovering ammonia from the gas.

My invention has for further objects such other new and useful operative advantages or results as may hereinafter be found to obtain.

Briefly stated, my invention consists in compressing the gas, cooling it, and treating it while cool and under compression with a hygroscopic agent, whereby the effectiveness of said agent may be greatly increased.

In order that my invention may be clearly set forth and understood, the preferred manner in which it is embodied and performed will now be described, with reference to the accompanying drawing. In the drawing, the single figure is a diagrammatic view of apparatus for dehydrating gas, including means for compressing, cooling and treating the gas.

Referring to the drawing, the gas to be dehydrated is passed through a compressor 1, in which it is compressed to the desired pressure. The gas then enters a tower 2, where it is washed with cold water and reduced to a temperature as low as it is possible to obtain in this manner. After leaving the tower 2, the gas passes upwardly through a tower 3, which is provided with a plurality of contact means 4 and cooling means 5. During the passage of the gas through the tower 3, it is washed with a saturated solution of calcium chloride, which is a hygroscopic agent capable of reducing the dew-point of the gas.

By thus compressing the gas and subsequently treating it while compressed, after cooling with a concentrated solution of calcium chloride, the dew-point of the treated gas, when allowed to expand to atmospheric pressure, will be considerably lower than if the same gas, uncompressed, were treated with the same solution at the same temperature. It is known that calcium chloride, as a hygroscopic agent, is most economically used in the form of a saturated solution. However, using such a solution to treat gas, at ordinary working pressures, and without supplemental refrigeration, etc., cannot be relied upon to reduce the dew-point of the gas to below 45° F., whereas, by compressing the gas and treating it under pressure, it becomes possible to obtain a dew-point of 30° F., which is desirable.

The actual pressures employed will vary according to the dew-point desired in the treated gas and the degree of cooling possible with the available water for this purpose.

The following table shows the pressure to which a gas must be compressed in order that the gas, after treatment with a concentrated calcium chloride solution and expansion to atmospheric pressure, will have a dew-point of 30° F.

| Temperature of gas before and after compression | Equilibrium dew-point of CaCl₂ solution | Pressure required lbs. sq. in. gauge |
|---|---|---|
| °F. | °F. | Pounds |
| 60 | 38 | 6 |
| 70 | 44 | 11 |
| 80 | 48 | 16 |

The "actual" equilibrium dew-point of the calcium chloride solution, as given above, is taken as 6° F. above the theoretical, which has been found to be a representative of practical results.

With regard to the actual pressures employed, it will, of course, be realized that any fuel gas being treated will be under some pressure, and in certain systems, a comparatively high distribution pressure may be necessary. The economical pressures at which I prefer to operate are in the neighborhood of one atmosphere, more or less, depending on circumstances. In any case, if, for example, 15 lbs. pressure were required to "squeeze out" moisture from the gas to such point that subsequent treatment with a concentrated solution of calcium chloride would produce a dew-point sufficiently low, for example, 30° F., this would not mean 15 lbs. gauge, but 15 lbs. above the distribution pressure. If the latter were 5 lbs., the actual gauge pressure during the treatment with the hygroscopic agent would be 20 lbs.

When calcium chloride solution is used as the hygroscopic agent, the solution will ordinarily be re-circulated, being reconcentrated and cooled during re-circulation. The solution leaving the tower 3 passes by gravity into a sump 6 and is forced by a pump 7 through a water-sprayed cooling coil 8 and a spray system 9 into the tower 3. A portion, or all, of the solution may be passed through an evaporator 10, either continuously or intermittently for reconcentration.

However, an advantage of my invention resides in the fact that the amount of calcium chloride necessary may be reduced to such an economical figure that reconcentration may be dispensed with. In this instance, the solution would be re-circulated in the usual manner, solid calcium chloride being added at any convenient point to account for the dilution caused by the moisture removed from the gas. The excess volume of the concentrated solution would then be discarded, continuously or from time to time, and reconcentration would not be necessary.

It will be seen that a supply of cooling water for the tower 2, the coils 5 and the coils 8 is ordinarily required. This water is allowed to accumulate in a sump 11 situated below an atmospheric cooling tower 12. A portion of the water is pumped by a pump 13 through a spray system 14 over the tower 2 while a portion is forced by a pump 15 through the coils 5 and/or over the coils 8, as required. That portion of the water delivered by the pump 15 to the coils 5, together with the effluent from the tower 2, drains into a sump 16, while that portion which has passed over the coils 8 collects in a sump 17. Pumps 18 and 19 force the water from sumps 16 and 17, respectively, over the atmospheric cooling tower 12, where water is cooled as much as possible, according to the temperature of the atmosphere before descending into the sump 11.

The compressed, cooled and treated gas flows from the tower 3 into a pressure storage tank 20 and is released through a regulator 21 at normal pressure into a storage holder 22, or the mains.

When sulphuric acid is used as the hygroscopic agent, it may be reconcentrated and re-circulated, but this is more difficult than is the case when a salt solution is employed. Furthermore, as sulphuric acid is ordinarily used to treat the gas for the removal of ammonia as ammonium sulphate, it is preferable to pass concentrated acid through the treating tower but once and to so regulate the dilution of the acid that the diluted acid may be employed in the saturator and is still so concentrated as to avoid corrosion of the iron and steel apparatus which it is most convenient to employ.

In this case, concentrated sulphuric acid of, for example, 60° Baumé strength, is supplied to the tower 3 from a tank 23. After traversing the tower 3 in contact with the gas, the diluted acid drains into the sump 6 and is supplied to the saturators.

In prior practice using sulphuric acid of 60° Baumé strength, the reduction of coke-oven gas saturated at 80° F. to a dew-point of 30° F. would require 62.3 pounds of 60° Baumé acid per ton of coal carbonized, provided the dilution of the acid is not carried below 50° Baumé. This amount of sulphuric acid is considerably in excess of the normal requirement for ammonium sulphate recovery, which is 25 pounds of 60° Baumé per ton of coal carbonized.

In the copending application of Charles J. Ramsburg, Serial No. 45,674, filed July 23, 1925, a system of dehydration is described and claimed in which the dehydration of gas is accomplished by means of sulphuric acid, in such fashion that the amount of diluted acid is approximately equal to, or "balances" the requirement for removing ammonia from the gas in the saturators. This process, however, is based upon the performance of a coke-oven plant in which a portion of the coke-oven gas produced is used for underfiring the ovens. From 35 to 50% of the gas is generally required for this purpose, depending upon the design of the coke ovens, and does not require dehydration. Thus, in Ramsburg's process, the amount of acid necessary to dehydrate the surplus gas balances the amount necessary for recovering ammonia from the total gas. Under modern conditions and with modern coke ovens, there is a growing and already well-established tendency to use producer gas or other cheap gas for underfiring the ovens, thus releasing all of the valuable coke-oven gas for distribution. In this case, the dehydration of the total gas, even with Ramsburg's improved methods, would produce dilute acid in amount considerably above the sulphate requirement.

However, according to my invention, the amount of acid required for dehydration of the total gas can be reduced to the ammonium sulphate requirement or even less, if so desired, by varying the pressure to which the gas is compressed and the temperature to which it is cooled after compression.

A further advantage of my invention resides in the fact that, in using sulphuric acid as hygroscopic agent under ordinary conditions, the moisture removed is of such amount that considerable dilution of the acid takes place, with consequent excessive heat of dilution, which must be provided for. In my invention, however, the amount of moisture absorbed by the acid may be reduced to such amount that cooling during contact with the acid may be dispensed with, although I provide cooling means for this purpose for special conditions and emergencies.

My invention makes possible the dehydration of gas to a dew-point lower than heretofore possible with hygroscopic agents of the nature indicated and without refrigeration.

My invention is not limited to the specific examples given hereinabove by way of illustration but may variously be employed within the scope of the following claims.

I claim as my invention:

1. The process of dehydrating fuel gas which comprises compressing the gas, treating the compressed gas directly with a liquid cooling agent, treating the compressed and cooled gas with a water absorbing material, and effecting indirect contact between the water absorbing material and a cooling fluid during the treatment of the gas with said water absorbing material.

2. The process of dehydrating fuel gas which comprises compressing the gas, cooling the compressed gas by direct contact with water at substantially atmospheric temperature, whereby a portion of the moisture carried by said fuel gas is removed, and then treating the compressed and cooled gas with a hygroscopic material for further removal of moisture therefrom.

3. The process of dehydrating fuel gas which comprises compressing the gas, cooling the compressed gas by direct contact with water at substantially atmospheric temperature, whereby a portion of the moisture carried by said fuel gas is removed, and then treating the compressed and cooled gas with a hygroscopic liquid for further removal of moisture therefrom.

4. The process of dehydrating fuel gas which comprises compressing the gas, cooling the compressed gas by direct contact with water at substantially atmospheric temperature, whereby a portion of the moisture carried by said fuel gas is removed, and then treating the compressed and cooled gas with sulphuric acid for further removal of moisture therefrom.

5. The process of dehydrating coal gas which comprises compressing the gas, cooling the compressed gas, whereby a portion of the moisture contained by said gas is removed, and then treating the gas with sulphuric acid for further removal of moisture therefrom, the extent of such compression and cooling being such as to reduce the amount of acid required to dehydrate the gas to a dew point of about 30° F. to such amount that the resulting diluted acid balances the normal acid requirement for substantially completely removing ammonia from the same amount of said gas.

6. The process of dehydrating coal gas which comprises compressing the gas, cooling the compressed gas, whereby a portion of the moisture contained by said gas is removed, and then treating the gas with concentrated sulphuric acid for further removal of moisture therefrom, the extent of such compression and cooling being such that the acid required to dehydrate the gas to the desired dew point, after contact with the gas, is not more in amount nor less concentrated than is normally required for substantially complete removal of ammonia from the same amount of said gas.

7. The process of dehydrating fuel gas which comprises compressing the gas, cooling the compressed gas to approximately atmospheric temperature, whereby a portion of the moisture contained by said gas is removed, and then treating the cooled and compressed gas with a hygroscopic liquid for further removal of moisture therefrom.

8. The process of dehydrating fuel gas which comprises compressing the gas, cooling the compressed gas to approximately atmospheric temperature, whereby a portion of the moisture contained by said gas is removed, and then treating the cooled and compressed gas with sulphuric acid for further removal of moisture therefrom.

9. The process of dehydrating fuel gas which comprises compressing the gas, cooling the compressed gas by direct contact with water at substantially atmospheric temperature, whereby a portion of the moisture carried by said fuel gas is removed, and then treating the compressed and cooled gas with a calcium chloride solution for further removal of moisture therefrom.

10. The process of dehydrating fuel gas which comprises compressing the gas, cooling the compressed gas to approximately atmospheric temperature, whereby a portion of the moisture contained by said gas is removed, and then treating the cooled and compressed gas with a calcium chloride solution for further removal of moisture therefrom.

In testimony whereof, I have hereunto subscribed my name this ninth day of October, 1926.

FREDERICK W. SPERR, Jr.